UNITED STATES PATENT OFFICE.

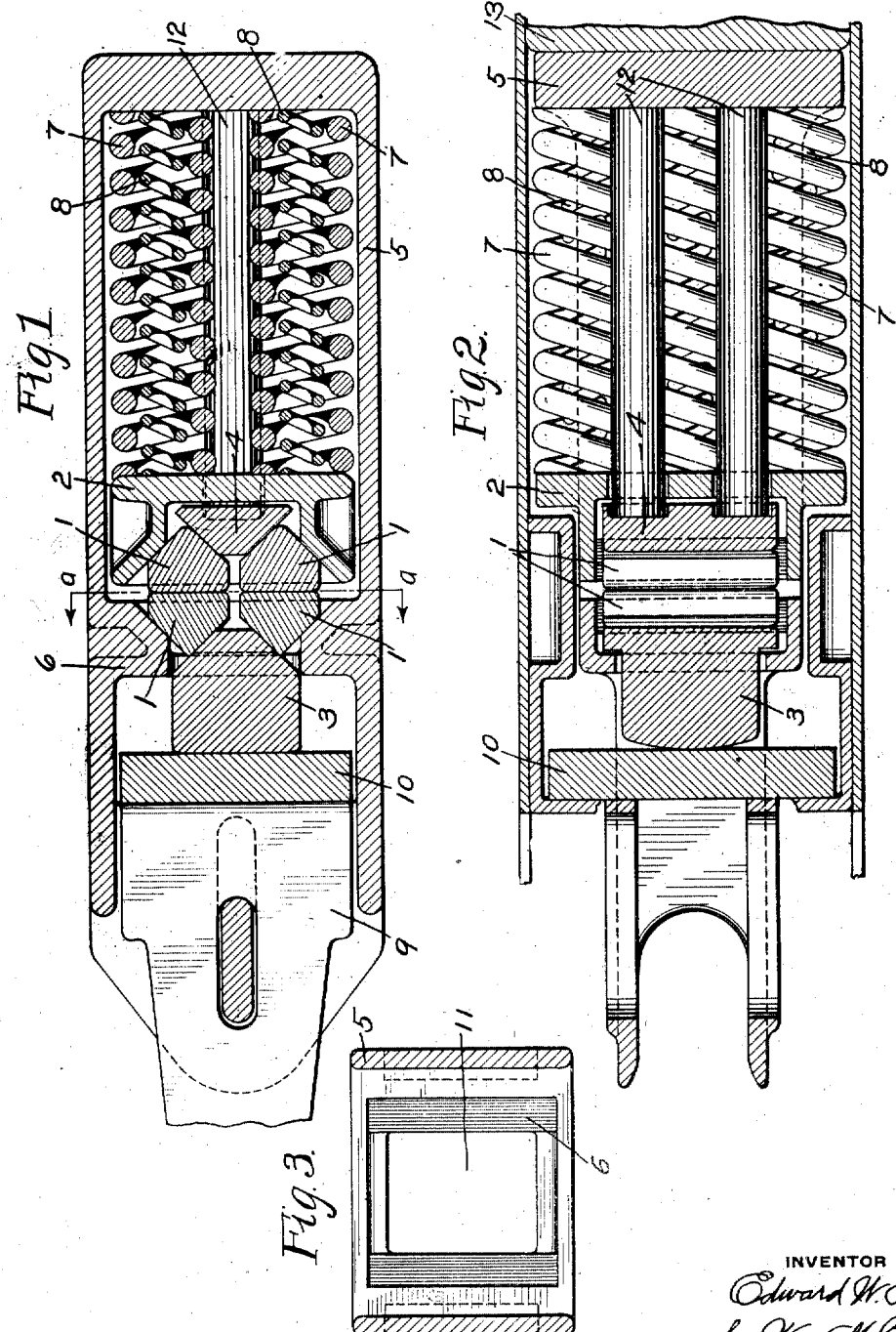

EDWARD W. NEWELL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FRICTION DRAFT-GEAR.

1,280,282.     Specification of Letters Patent.     Patented Oct. 1, 1918.

Application filed March 22, 1916. Serial No. 85,934.

*To all whom it may concern:*

Be it known that I, EDWARD W. NEWELL, a citizen of the United States, residing at Pittsburgh, in the county of Allegheny and State of Pennsylvania, have invented new and useful Improvements in Friction Draft-Gears, of which the following is a specification.

This invention relates to friction draft gear, and more particularly to a type employing laterally and longitudinally movable wedge blocks and draft springs for opposing the relative longitudinal movement of said blocks.

With this type of friction draft gear, it is necessary to maintain the wedge blocks in position when subjected to buffing and draft stresses and to accomplish this purpose, the principal object of my invention is to provide a draft gear yoke having friction faces adapted to coöperate with friction faces of the wedge blocks.

In the accompanying drawing; Figure 1 is a central longitudinal vertical section of a friction draft gear and yoke embodying my invention; Fig. 2 a central longitudinal horizontal section thereof; and Fig. 3 a transverse section of the yoke on the line *a—a* of Fig. 1.

As shown in the drawing, the draft gear may comprise wedge blocks 1 having inclined friction faces for engaging inclined friction faces on a member 2, inclined friction faces for engaging similar faces on opposed plunger wedges 3 and 4, and according to my invention, the yoke 5 is provided with an integral transverse wall 6 having inclined friction faces adapted to engage corresponding friction faces on the wedge blocks 1.

Interposed between the rear end wall of the yoke 5 and the member 2 are a plurality of draft springs 7 and 8 and the draw-bar 9 engages a follower plate 10 which in turn engages the front end of the central plunger wedge 3.

The wall 6 has a central opening 11 through which the front plunger wedge 3 extends and the rear plunger wedge 4 is provided with stems 12 adapted to engage the rear end wall of the yoke 5.

In operation, when the draft gear is subjected to a buffing stress, the draw-bar 9 forces the follower 10 rearwardly and with it the front plunger wedge 3 and since the rear plunger wedge 4 is prevented from moving rearwardly through the engagement of the stems 12 with the rear wall of yoke 5, the wedge blocks 1 are moved rearwardly and laterally, displacing the member 2 against the resistance of the draft springs 7 and 8.

It will now be noted that in this movement of the parts, the wedge blocks 1 are maintained in position to develop frictional resistance by the aid of the engaging friction faces on the wall 6.

Under a draft stress, the yoke 5 is pulled forward by the draw-bar 9 and since the front plunger wedge 3 is held from forward movement by engagement with the follower plate 10, the forward movement of the yoke causes the rear plunger wedge to force the wedge blocks 1 forwardly and laterally, the movement being opposed by the draft springs 7 and 8 tending to pass the member 2 forwardly. As in buffing, it will be seen that the friction faces of the transverse wall 6 assist in holding the wedge blocks in position.

In addition to the function of holding the wedge blocks in position under buffing and draft stresses, the employment of the transverse wall serves to provide a tying connection between the sides of the yoke so as to prevent spreading.

Having now described my invention, what I claim as new and desire to secure by Letters Patent, is:—

1. In a friction draft gear, the combination with wedge blocks arranged at one end of the draft gear and having oppositely inclined friction faces and a draft spring for opposing movement of said blocks, of a yoke having at one end opposite inclined friction faces and a follower having opposite inclined friction faces adapted to engage corresponding friction faces of the wedge blocks.

2. In a friction draft gear, the combination with wedge blocks having inclined faces, of a draft yoke having a transverse wall provided with inclined faces adapted to engage the inclined faces of the wedge blocks.

3. A yoke for friction draft gears comprising side walls, an end wall connecting the side walls, and a transverse wall integrally connecting the side walls and provided with oppositely inclined friction faces.

4. In a friction draft gear, the combination with a draft spring, oppositely facing plunger wedges having oppositely inclined friction faces, a member having oppositely inclined friction faces and movable against the resistance of the draft spring, a yoke having a transverse wall provided with inclined friction faces, and wedge blocks having oppositely inclined friction faces for engaging the friction faces of the plunger wedges, said member, and the yoke.

5. In a friction draft gear, the combination with a draft spring, oppositely facing plunger wedges having oppositely inclined friction faces, a member having oppositely inclined friction faces and movable against the resistance of the draft spring, a yoke having a transverse wall containing an opening for the passage of one plunger wedge and provided with inclined friction faces, and wedge blocks having oppositely inclined friction faces for engaging the friction faces of the yoke, the plunger wedges, and said member.

In testimony whereof I have hereunto set my hand.

EDWARD W. NEWELL.